(12) United States Patent
Post et al.

(10) Patent No.: US 9,374,176 B2
(45) Date of Patent: Jun. 21, 2016

(54) AUTOMATIC GAIN CONTROL SUB-CIRCUIT MANAGEMENT

(71) Applicant: Square, Inc., San Francisco, CA (US)

(72) Inventors: Dan Post, San Mateo, CA (US); Kartik Lamba, Berkeley, CA (US); Jeremy Wade, San Francisco, CA (US); Rodion Steshenko, Oakland, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/295,186

(22) Filed: Jun. 3, 2014

(65) Prior Publication Data
US 2015/0349896 A1 Dec. 3, 2015

(51) Int. Cl.
| | |
|---|---|
| *H04B 15/00* | (2006.01) |
| *G06Q 20/20* | (2012.01) |
| *G06Q 20/32* | (2012.01) |
| *G06K 7/01* | (2006.01) |
| *G06K 7/08* | (2006.01) |

(52) U.S. Cl.
CPC ............... *H04B 15/005* (2013.01); *G06K 7/01* (2013.01); *G06K 7/087* (2013.01); *G06Q 20/202* (2013.01); *G06Q 20/322* (2013.01)

(58) Field of Classification Search
CPC .. G06Q 20/322; G06Q 20/202; G07F 7/0886; H04B 15/005; G06K 7/01; G06K 7/087
See application file for complete search history.

(56) References Cited

U.S. PATENT DOCUMENTS

| | | | | |
|---|---|---|---|---|
| 3,573,598 | A | * 4/1971 | Clarke | ............ H02M 3/137 363/27 |
| 2004/0104268 | A1 | 6/2004 | Bailey | |
| 2005/0038840 | A1 | * 2/2005 | Miller, Jr. | ............ G06F 7/588 708/250 |
| 2005/0250462 | A1 | 11/2005 | Wu et al. | |
| 2010/0237943 | A1 | * 9/2010 | Kim et al. | ............ 330/254 |
| 2012/0091201 | A1 | * 4/2012 | Babu et al. | ............ 235/380 |
| 2012/0095915 | A1 | 4/2012 | McKelvey | |
| 2012/0097739 | A1 | 4/2012 | Babu et al. | |
| 2013/0344805 | A1 | 12/2013 | Lefley | |
| 2014/0169430 | A1 | * 6/2014 | Nilsson | ............ H04B 7/043 375/227 |

OTHER PUBLICATIONS

International Search Report and Written opinion for PCT application No. PCT/US2015/33817, mailed Oct. 23, 2015.

* cited by examiner

*Primary Examiner* — Sonji Johnson
(74) *Attorney, Agent, or Firm* — Polsinelli PC

(57) ABSTRACT

Aspects of the subject disclosure provide a reader device for managing operation of an automatic gain control (AGC) sub-circuit on a host device computing device. In some implementations, a reader device of the subject technology can include a controller, a noise generator, noise coupling circuitry, and a 3.5 mm audio plug including an audio bus that is configured for insertion into a headphone port of a host device, such as a smart phone or tablet computer. Upon connection of the reader device to the host computing device, the reader device can provide an intentional noise signal to the host device via a signal path where the intentional noise signal is configured to establish a substantially stable gain amount at the AGC sub-circuit.

18 Claims, 5 Drawing Sheets

AUTOMATIC GAIN CONTROL SUB-CIRCUIT MANAGEMENT

BACKGROUND

An increasing number of hardware attachments are available to expand upon the functional capabilities of mobile computing devices, such as smart phones. In some instances, card reader attachments, which enable the reading of payment information from a magnetic strip (such as a credit card), can be coupled to a host device via a standard 3.5 m headphone port. In such a configuration, the payment information from the magnetic strip is forwarded to the host device by configuring the card reader to encode the payment information into an audio signal and transmit the audio signal to the host device via an audio input channel of the host device in the headphone port. The audio signal is then detected by the host device, decoded to retrieve the payment information, and the payment information is processed locally or remotely to effect payment. In a typical headphone port, the host device utilizes automatic gain control (AGC) circuitry to amplify signals to facilitate their detection. However, since AGC circuitry on the host device is typically not configured to discriminate between intentional and unintentional signals on the audio input channel, the host device may expend resources on processing signals other than those generated by the reader device.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1A:
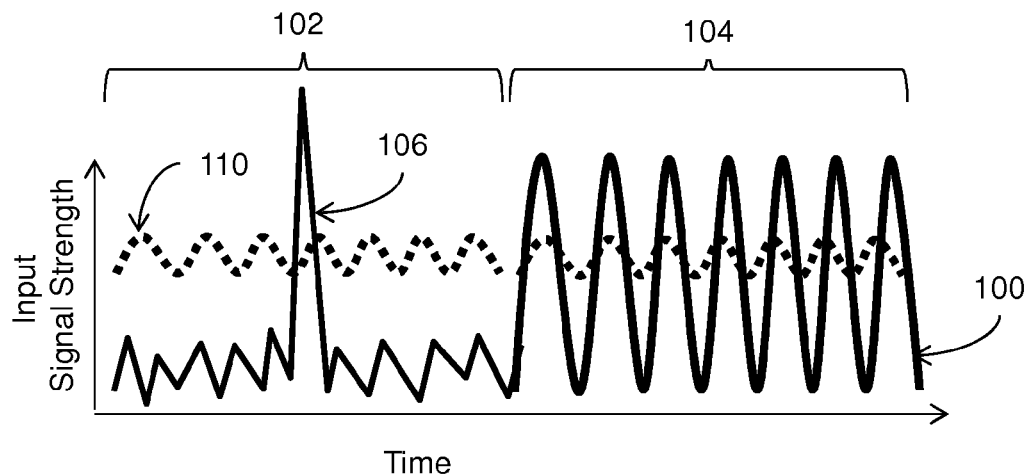
FIGS. 1A, 1B, and 1C illustrate conceptual example waveforms that illustrate the function of the present technology.

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear that the subject technology is not limited to the specific details set forth herein and may be practiced without these specific details. In some instances, structures and components are shown in block diagram form in order to avoid obscuring the concepts of the subject technology.

As noted above, one of the limitations of using a reader device, such as a credit card reader device, with a host device via an audio input channel is that since an AGC is typically not configured to discriminate between intentional and unintentional signals on the audio input channel, the AGC in a host device may cause false signals to be detected on the audio channel. In host devices such as smartphones, the AGC of the host device is typically configured to amplify signals on the audio input channel in order to ensure that soft voices are heard just as clearly as loud voices. Thus, the AGC amplifies soft voices by automatically increasing gain for the audio input channel. Unfortunately, this functionality also causes the AGC to amplify signals caused by spurious or random noise from internal or external sources in the absence of an intentional signal, such as signals representing voices or signals generated by a reader device.

In the case of an audio channel, spurious or random noise signals can be generated in a variety of ways. For example, in the case where a cellular phone is operating nearby (or the host device itself is a cellular phone), the radio frequency signals transmitted by a cellular transceiver upon making a call can generate signals on the audio channel and thus cause the host device to incorrectly determine that the reader is forwarding payment information for processing. In another example, the host device or other nearby devices may be generating or transmitting electrical power to an extent that electromagnetic waves are produced that generate signals on the audio channel. In still another example, while electromagnetic waves or radiofrequency waves from multiple devices may be produced and may not individually cause the generation of signals on an audio channel, the combination or mixing of these waves may result in another wave which can generate signals on the audio channel.

Regardless of the source of signals on the audio input channel, the AGC in the host device will typically automatically adjust gain for the audio input channel in an attempt to maintain an acceptable signal-to-noise ratio (SNR) for signals on this channel. Therefore, when a significant level of spurious or random noise signals are generated on the audio input channel, the AGC automatically amplifies the resulting signal in order to differentiate the spurious or random noise signals from the background level of noise signals. Unfortunately, in the case of conventional payment applications associated with existing reader devices, these applications are configured to automatically process any incoming signal when the reader device is attached. As a result, any amplified signal can potentially appear to the payment application as an intentional signal and cause the payment application to process the incoming signal as an input from the reader device. In some cases, this may only result in an error message at the application indicating that the payment information was unreadable. Therefore, in locations or configurations where such spurious or random noise signals are infrequent, the impact to the user is minimal. However, in locations where spurious and random noise signals are prevalent, the number of error messages generated can be an annoyance. Further, the frequent error messages can cause unnecessary processing to be performed by the payment application or even cause the payment application to crash.

The present technology addresses the foregoing problems by providing means by which the impact of spurious or random noise signals on an analog input line with AGC circuitry can be reduced or eliminated. In particular, the present technology is directed to a reader device configured for intentionally introducing a noise signal at the audio input channel of a corresponding host device. This intentional noise signal can be configured to have characteristics (e.g., power, amplitude, and frequency) that are substantially invariant as a function of time. The noise signal is also selected so that the amount of gain at the AGC, based on this intentional noise signal, is less than the amount of gain that would normally be provided by the AGC in response to most, if not all, spurious or random noise signals. That is, the intentional noise signal is selected to be stronger (e.g., a greater power or amplitude) than most, if not all, spurious or random noise signals expected to be encountered.

By configuring the intentional noise signal thusly, the gain of the AGC is maintained at a substantially stable level and provides an effective ceiling for the amount of gain actualized at the AGC. As a result, the presence of the intentional noise signal prevents the AGC from providing any amounts of gain that result in the amplification of spurious or random noise signals into detectable signals. Thus, such spurious or random noise signals are effectively prevented from being inadvertently identified as data signals. Additionally, the noise signal is further selected so that the amount of gain at the AGC for the noise signal is still greater than the amount of gain that would normally be provided at the AGC in response to a data signal. This ensures that a data signal from a reader device is still properly amplified by the AGC and dominates the resulting signal in order to still trigger processing of the data signal on the host device. That is, the SNR between the data signal and the intentional noise signal is still maintained relatively high.

Figure 1B:
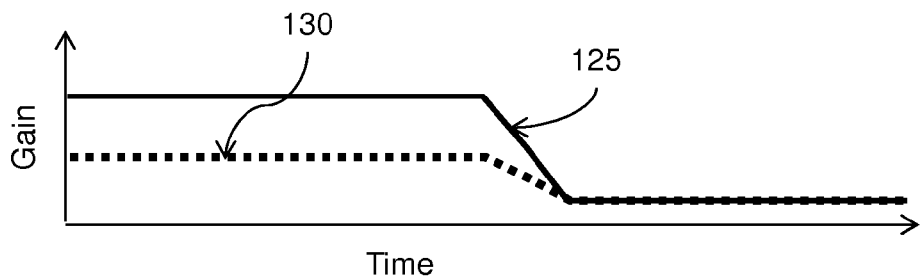
Figure 1C:
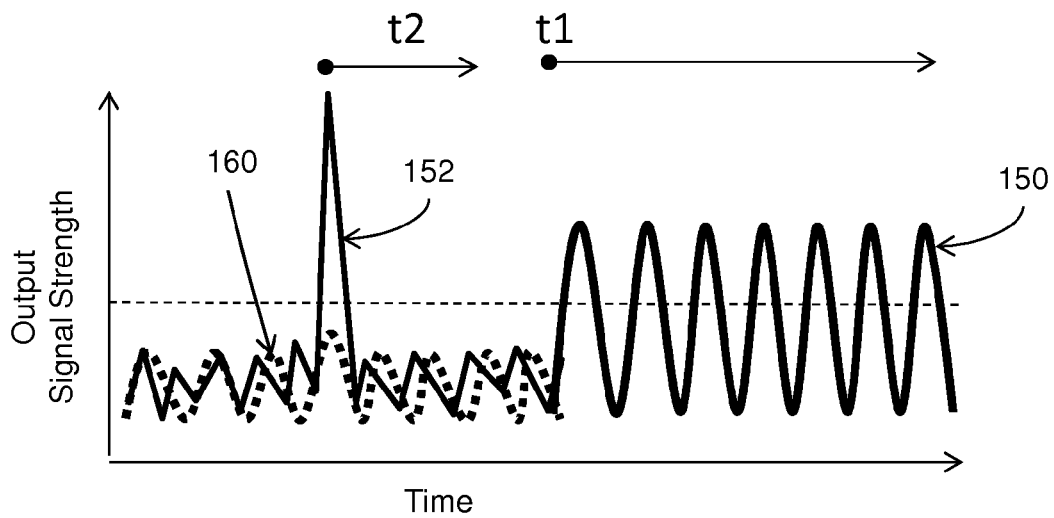

The operation of the various embodiments is illustrated with respect to FIGS. 1A-1C. Although the various embodiments will be described primarily with respect to audio signals, the present technology is not limited in this regard. The various embodiments of the present technology are equally applicable to any other type of analog signaling. Further, although the various embodiments will be described herein with respect to a single intentional noise signal, the present technology is not limited in this regard. In other embodiments, the intentional noise signal can be provided by the introduction of two or more noise signals into the audio input channel.

FIG. 1A is a x-y plot of input signal strength as a function of time for an audio signal channel that is useful for illustrating the present technology. FIG. 1B is a x-y plot of gain as a function of time for the input signals in FIG. 1A. FIG. 1C is a x-y plot of output signal strength as a function of time for an audio signal line that is useful for illustrating the present technology.

Turning now to FIG. 1A, a typical waveform 100 for an audio signal channel is shown. The first portion 102 corresponds to a time when no signal is being transmitted. The second portion 104 corresponds to a time when a signal is being transmitted. During the first portion 102, there may be noise, manifested as signal spikes 106 or the like. Note that these spikes can actually have signal strengths that are higher than that of the signal being transmitted. Next, turning to FIG. 1B, curve 125 represents the gain provided at the AGC for the waveform 100. In a typical audio signal AGC, the AGC operates by providing a gain based on the average peak signal detected during a time window. Therefore, as shown in FIG. 1B, the gain for waveform 100 is initially higher, corresponding to the low average input signal strength of portion 102 of waveform 100. Thereafter, the gain transitions to a lower amount, corresponding to the higher average signal strength of portion 104 of waveform 100. The result of gain curve 125 on waveform 100 is shown in FIG. 1C by output waveform 150.

In a typical receiver circuit, activation of downstream hardware or software, is configured to occur only when a signal (or derivative thereof) exceeds a certain threshold. Accordingly, an AGC is typically configured such that the gains provided are sufficient to result in signals that activate the downstream hardware or software only when the input signal is an intentional signal (e.g., a signal as in portion 104 of waveform 100). In the absence of noise, such a scheme can operate without issue. However, in the case of noise (e.g., signal spike 106), this can be problematic.

For example, referring to FIG. 1C, the gain selected for portion 104 causes the output signal to be properly amplified and cause the downstream hardware and software to be activated starting at time t1. Such operation can continue for a time period whenever the triggering signal is detected or until a triggering signal is no longer detected with in a time window. However, this method of operation is problematic for times when no signal is being provided and the audio channel is susceptible to noise, such as in portion 102. In this case, the spike 106 of waveform 100 causes a corresponding spike 152 in output waveform 150, which is amplified by the higher gain for portion 102. As a result, spike 152 can potentially provide the triggering signal as well, resulting in erroneous triggering of downstream hardware and software during time t2.

The present technology alleviates the problems with such spurious and random noise as follows. First, referring back to FIG. 1A, the present technology provides an intentional noise signal 110 that is combined with existing signals on the audio channel. This intentional noise signal is configured to be higher than the typical background noise on the audio channel, but not high enough to trigger processing of downstream hardware and software when amplified. As a result, the higher level of the intentional noise signal, compared to typical background noise, is higher and results in gain curve 130 in FIG. 1B. As with gain curve 125, the gain is still initially higher, corresponding to the lower average input signal strength of the intentional noise signal for portion 102 of waveform 100. However, since the intentional noise signal is higher, the gain in this portion of gain curve 130 will be lower than the gain in the corresponding portion of gain curve 125. Thereafter, the gain in gain curve 130 transitions to a lower amount, similar to that in gain curve 125, which corresponds to the higher average signal strength of portion 104 of waveform 100.

The effect of gain curve 130 is shown in FIG. 1C by output waveform 160, shown by the dotted lines. With regards to portion 104 of waveform 100, the corresponding portion output put waveform 160 are relatively unchanged, as the gain still amplifies the intentional signal and continues to trigger downstream hardware or software, as discussed above. However, in the case of portion 102 of waveform 100, the corresponding portion of output waveform 160 is significantly changed. In particular, reduced gain for portion 102 of waveform 100 reduces the amount of amplification for spike 106. Thus, a corresponding spike in waveform 160 can be reduced or eliminated. In particular, the amplification of spike 106 is reduced so that the corresponding feature in waveform 160 is insufficient for triggering the downstream hardware or software. In other words, while spike 106 of waveform 100 can cause a corresponding spike 152 in the context of gain curve 125 as discussed above, in the context of gain curve 130 spike 152 does not exist as such, or is greatly reduced.

Figure 2A:
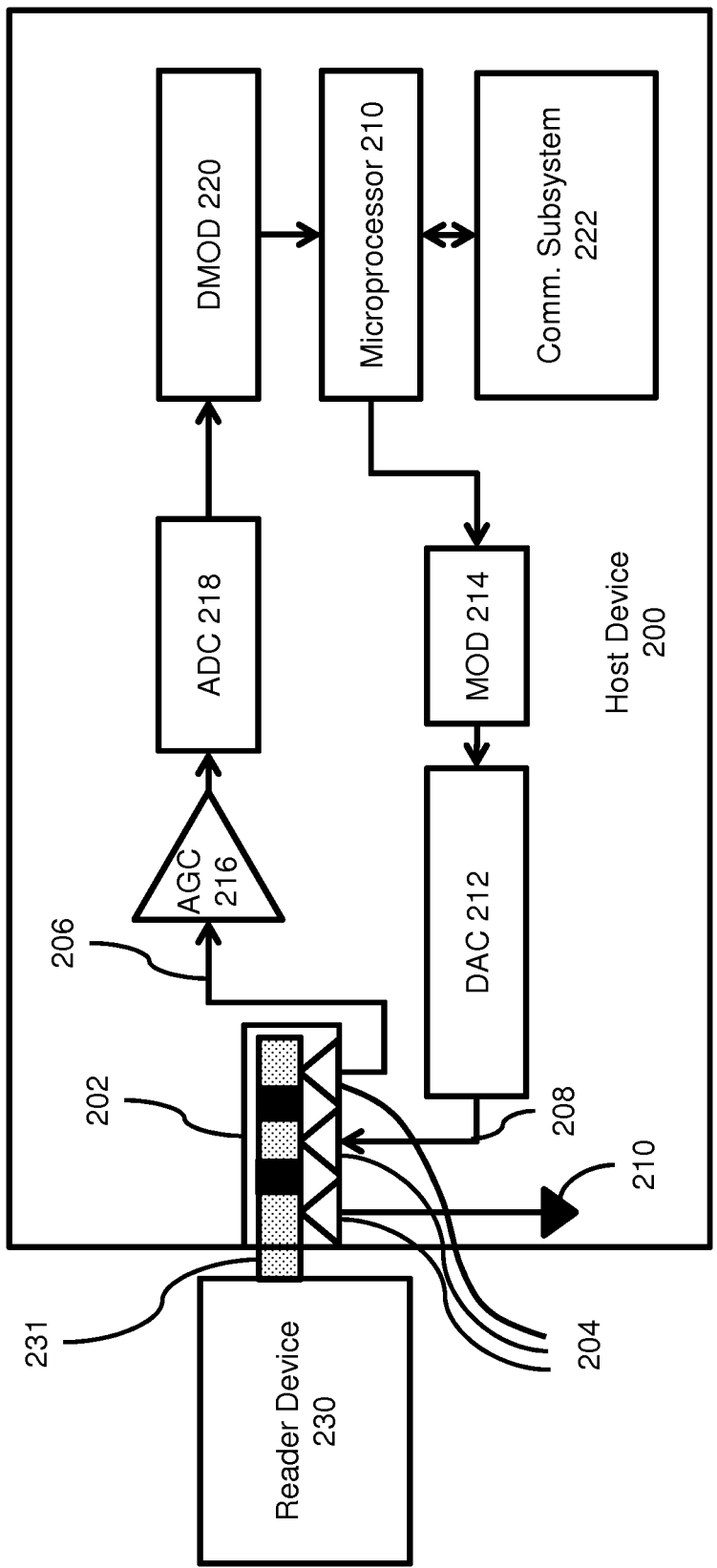
FIGS. 2A and 2B show conceptual block diagrams illustrating hardware components used to provide automatic gain control for an audio channel between a reader device and a host computing device.

The operation of a reader device configured according to the present technology is further described below with respect to FIGS. 2A and 2B. Turning first to FIG. 2A, there is shown a conceptual block diagram of host device 200 and a reader device 230 configured according to the present technology. The host device 200 can be any network enabled device. Although the various embodiments will be described primarily with respect to a smart phone configuration for the host device 200, the present technology is not limited in this regard. Thus, host device 200 can also be, for example, any of a desktop computer, a mobile computer, a handheld communications device (e.g., mobile phones, smart phones, and tablets), a smart television set, a set-top box, or a gaming console.

FIG. 2A shows an exemplary configuration for host device 200. However, the present disclosure contemplates that a host device can include more or less components than shown in FIG. 2A. As shown in FIG. 2A, host device 200 can include an audio port 202 for receiving a connector 231 of reader device 230. In the exemplary configuration of FIG. 2, the audio port 202 is a headphone jack and the connector 231 is a corresponding headphone plug. For each contact in connector 231, the audio port 202 provides corresponding terminals 204 to connect the contacts in connector 231 to different parts of the host device 200. For example, as shown in FIG. 2, the terminals 204 are configured to connect a first contact of connector 231 to an audio input channel 206 of host device 200, connect a second contact of connector 231 to an audio output channel 208 of host device 200, and connect a third contact of connector 231 to a ground plane of host device. Each of these channels, along with corresponding portions of the audio port 202, terminals 204, and connector 231, and the corresponding channels in reader device 230 each define signal paths.

It should be noted that while FIG. 2A illustrates specific connections between reader device 230 and portions of host device 200, the present disclosure contemplates that circuitry can be provided in host device 200 with logic to automatically route signals from connector 231 to appropriate circuits in host device 200. For example, multiplexing circuits or other types of routing circuits can be provided in host device 200. Further, although connector 231 and host device 200 are shown in FIG. 2 as including only three contacts and three terminals, respectively, the present disclosure contemplates that any number of contacts can be provided in the various embodiments.

The audio output channel 208 can be coupled to a microprocessor 210 of host device 200 via a digital-to-analog converter (DAC) 212 and modulator (MOD) 214. Thus, when the microprocessor 210 generates digital data for the reader device 230, the digital data is transmitted as digital signals to MOD 214 to encode the digital signals into a modulated signal embodying the digital data and thereafter to DAC 212 to convert the modulated signal into an analog signal suitable from transmission over audio output channel 208 to reader device 230. The audio input channel 206 can be coupled to microprocessor 210 of host device 200 via an ACG sub-circuit 216 and a signal processing system defined by an analog-to-digital converter (ADC) 218 and demodulator (DMOD) 220. Thus, when a signal is received on the audio input channel 206, the ACG sub-circuit 216 adjusts the gain to improve SNR. Thereafter the amplified signal is converted from an analog signal to a digital signal by ADC 218. Finally, the digital signal is demodulated at DMOD 220 to provide the data to microprocessor 210. Via audio input channel 206, audio output channel 208, and associated components, the host device 200 can engage in bidirectional communications with the reader device 230 using audio signaling, e.g., carrier waves representing audio signals.

The microprocessor 210 can be coupled to a communications subsystem 222. In the various embodiments, microprocessor 210 and the communications subsystem 222 can be the main microprocessor and communications subsystem for the host device 200 or for a subsystem thereof. Thus, the communications subsystem 222 can directly communicate with a network and devices beyond or can simply be used to communicate with other portions of host device 200.

Figure 2B:
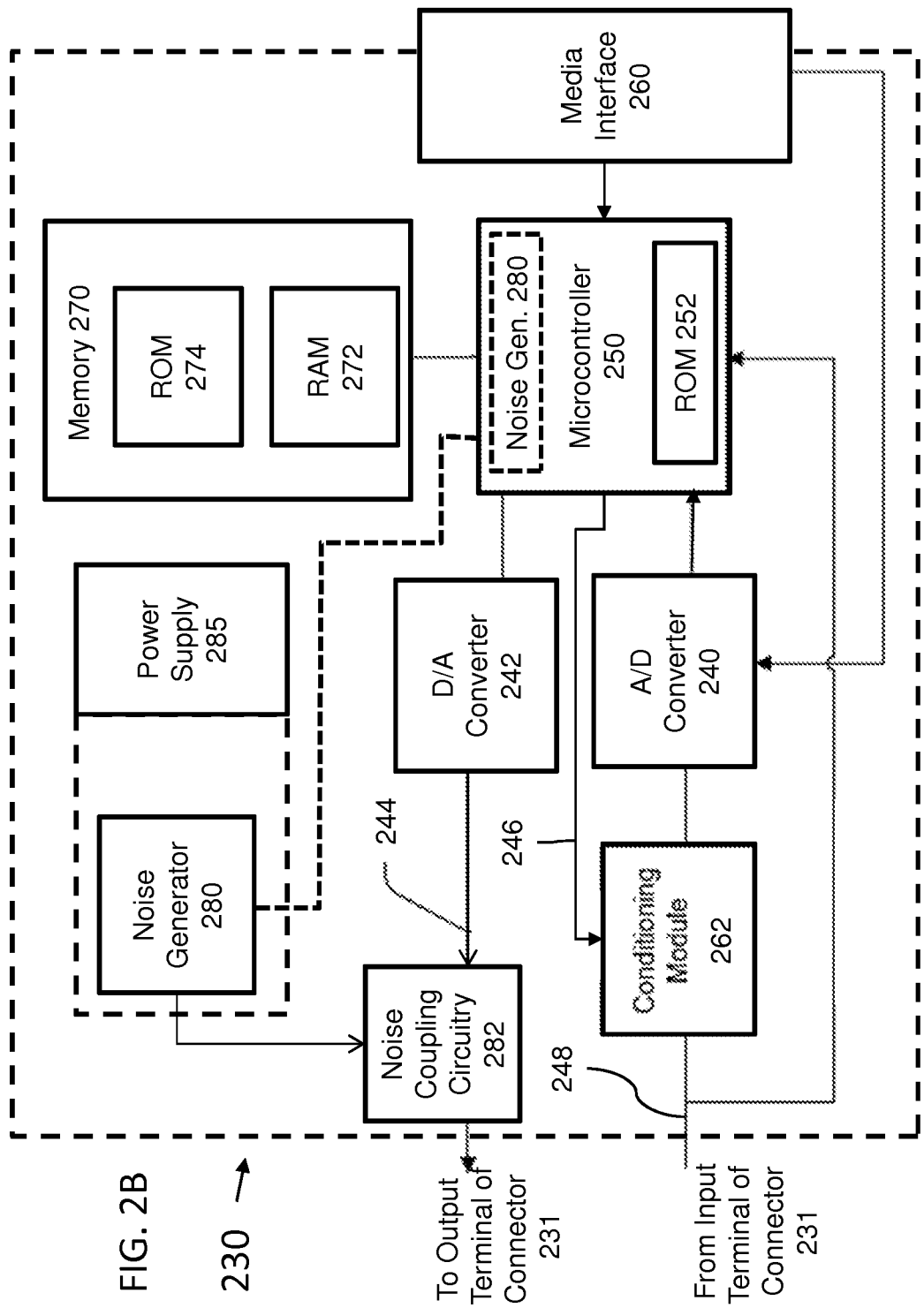

Now turning to a more detailed description of the reader device 230, FIG. 2B illustrates a conceptual block diagram of hardware components for a reader device 230 configured in accordance with the present technology. Reader device 230 includes a processor or microcontroller 250, memory 270, digital-to-analog converter (DAC) 242, analog-to-digital converter (ADC) 240, conditioning module 262, media interface 260, power supply 285, noise generator 280, and noise coupling circuitry 282. In an alternative embodiment, noise generator 280 can be located within microcontroller 250. Details of this alternate embodiment will be described below in greater detail.

As illustrated in FIG. 2B, microcontroller 250 is coupled to memory 270, DAC 242 and ADC 240. Additionally, microcontroller 250 is coupled to conditioning module 262, via audio input channel 248, as well as media interface 260, either directly or via ADC 240. In turn, ADC 240 is coupled to conditioning module 262, via audio input channel 248. Via DAC 242, audio input channel 244, ADC 240, and audio output channel 248, the reader device 230 can engage in bidirectional communications with the host computing device using audio signaling, e.g., carrier waves representing audio signals.

In some embodiments, to reduce the number of components necessary in the reader device 230, various components can be configured to perform multiple tasks within the card reader 242. For example, ADC 240 can be configured for handling the conversion of analog signals obtained from media interface 260 (e.g., during a card swipe) to digital signals for use by the microcontroller 250 and also for handling the conversion of analog signals received via audio input channel 248 to digital signals for use by the microcontroller 250.

The microcontroller 250 can control DAC 242 to adjust the output characteristics of any audio signaling provided on audio output channel 244. These can include, but are not limited to, gain and frequency band of any amplifier in DAC 242. Additionally, the microcontroller 250 can adjust the frequency, amplitude, and phase for the modulation scheme used to encode digital data into the audio signaling. The present disclosure contemplates that the modulation for the audio signaling can occur within DAC 242, microcontroller 250, or another component (not shown) positioned in between DAC 242 and microcontroller 250.

Microcontroller 250 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Memory 270 can include various types of memories, including working memory in the form of random-access memory (RAM) 272 and read-only memory (ROM) 274. Additionally, various types of memory can be utilized in place of, or in addition to, memory 270. For example, the one or more sequences of instructions for operating the reader device 230 can be stored as the bootloader software or firmware in a ROM 212 within microcontroller 250 or in the ROM 274 within memory 270. One or more sequences of instructions can also be software stored and read from another storage medium, such as the flash memory array, or received from the host computing device (e.g., a mobile device such as a smart phone or tablet computing device) via a host interface. ROM, storage mediums, and flash memory arrays represent examples of machine or computer readable media storing instructions/code executable by microcontroller 250. Machine or computer readable media may generally refer to any medium or media used to provide instructions to microcontroller 250, including both volatile media, such as dynamic memory used for storage media or for buffers within microcontroller 250, and non-volatile media, such as electronic media, optical media, and magnetic media.

Audio output channel 244 and audio input channel 248 can form a portion of an audio bus or connector 231, such as a standard 3.5mm audio plug (not shown) or other audio connector type with any number of terminals. In some implementations, audio input channel 248 can include multiple audio input channels, such as a left-audio input channel and a right-audio input channel.

Media interface 260 can form a device, or portion thereof, for reading media located on credit cards, debit cards, or objects to obtain payment information. In some implementations, the media interface 260 can be configured to read information from a physical storage medium, such as magnetic storage media (e.g., magnetic stripe media), optical storage media (e.g., barcodes or patterns), radio-frequency identification (RFID) storage devices, and integrated circuit card media (e.g., smart chip technologies or EMV), to name a few. Alternatively or in addition to the capability of reading such passive media, the media interface 260 can also be configured in some implementations to provide a wireless or wireline interface for interacting with other devices to provide such payment information.

As noted above, the reader device 230 also includes a power supply 285 for providing electrical power to the various components therein. Power supply 285 can be provided in a variety of ways. In some configurations, the power supply 285 can be implemented as a battery. In other embodiments, power supply 285 can be configured from drawing power from connector 231. For example, power supply 285 can be a transformer and/or charge pump device that can provide any operating voltages needed. In such a configuration, the other components can be designed to limit the amount of electrical power drawn. In still other configurations, both techniques can be combined.

As noted above, in addition to the foregoing components, the reader device 230 can also include a noise generator 280 and noise coupling circuitry 282. These components can be provided in a variety of ways. In some embodiments, the noise generator 280 can be configured to generate an intentional noise signal at a frequency of interest that can be directly inserted into the audio output channel 244. For example, in the case of audio signaling, the frequency can be an audio frequency (20 to 20,000 Hz). For example, the noise coupling circuitry 282 can be an electronic additive mixer for combining signals from DAC 242 with signals from noise generator 280. In another example, one or more resistive components can be used to directly couple the audio output channel 244 to the noise generator 280.

In other embodiments, the intentional noise signal can be indirectly coupled into the audio output channel 244. In one example, the intentional noise signal can be inductively coupled into the audio output channel 244 from another component of reader device 230. In such a configuration, the noise coupling circuitry 282 can include a second line arranged with respect to the audio output channel 244 such that when the noise generator 280 provides a signal in the second line, the second line produces an electromagnetic field that induces the intentional noise signal in the audio output channel 244. In some cases, the audio output channel 244 can be configured to facilitate such a process, for example, configuring portions of the audio output channel 244 and the second line as coils in close proximity.

In another example, the intentional noise signal can be induced in the audio output channel by capacitive coupling. That is, the audio output channel 244 and other components in reader device 230 can be arranged with a capacitance in between so that the AC component of a signal in such other components can be added as the intentional noise signal in audio input channel 244. In some cases, discrete capacitive components can be utilized to provide the necessary coupling. In other cases, the components in reader device 230 can be arranged to take advantage of the capacitive properties of certain portions of the reader device 230. For example, if the reader device 230 is formed using a printed circuit board (PCB), the dielectric properties of the PCB can be used to provide some or all of the needed capacitive elements. In still another example, any combination of inductive, capacitive, or resistive components can be provided to introduce the intentional noise signal into the audio output channel.

Although the discussion above contemplates the use of dedicated circuitry for inducing the noise in the audio output channel 244, the present technology is not limited in this regard. In some embodiments, the power supply 285 can, in addition to operating as a power source, also operate as the noise generator supplying the signal needed by noise coupling circuitry 282. In some particular embodiments, the power supply 285 can be configured to include a charge pump. As known to one of ordinary skill in the art, charge pumps operate to increase a voltage supplied by charging a capacitor to this same voltage. Switches are then used to change the circuit and place the capacitor in series with the supplied voltage, which effectively doubles the voltage, assuming no electrical leakage occurs. Additional capacitors can be added to further increase the voltage available for output. In the present technology, the switching rate for the charge pump, which is typically selected to reduce or eliminate the amount of charge that each cycle must store and dump from the capacitors, can be selected so that it corresponds to a frequency range of interest. For example, the frequency for audio channels is selected to be an audio frequency (20 to 20,000 Hz). Thus, by coupling such a charge pump to the audio output channel 244 via the noise coupling circuitry 282, the electromagnetic energy generated by the switching can be used to introduce an intentional noise signal, in the form of an alternating current signal with a substantially constant amplitude and with an audio frequency, in the audio output channel 244. As discussed above, the noise coupling circuitry 282 can be configured to introduce the intentional noise signal into the audio output channel 244 using inductor-based and/or capacitor-based coupling. In other configurations, the noise coupling circuitry 282 can include a separate line into which the intentional noise signal is introduced and an electronic mixer for adding the intentional noise signal into audio output channel 244.

The present disclosure contemplates that in some instances, the noise generator 280 (or power supply 285) can be configured to produce a signal from which the intentional noise signal is generated. For example, the signal actually generated can have at least one of a different power, frequency, or amplitude then the intentional noise signal desired on audio output channel 244. Thus, the resistive, inductive, capacitive elements utilized to introduce the intentional noise signal can be selected to transform the generated signal into the desired intentional noise signal.

In operation, the components shown in FIGS. 2A and 2B operate as follows. First, the reader device 230 is plugged into host device 100. This results in the initialization of the various components in the reader device 230. A corresponding application, such as a payment processing application, can then be contemporaneously invoked at the host device 200. This application can operate on microprocessor 250 or some other processor on host device 200. Upon its invocation, the application can begin monitoring for signals being received via audio input channel 206.

At reader device 230, the initialization process causes the noise generator 280 to begin operating to introduce the intentional noise signal into audio output channel 244 via the noise coupling circuitry 282. Thus, at the output terminal of connector 231, a signal is provided consisting of combination of the intentional noise signal and any other signal existing on audio output channel 244. In the event that the microcontroller 250 is idle (i.e., in the absence of a card swipe or other input at the media interface 260), the signal at the output terminal of connector 231 (and thus on audio output channel 244 and audio input channel 206) is the intentional noise signal and any other random or spurious noise signals introduced. Upon a card swipe or other input at the media interface 260, the microcontroller 250, via DAC 242, adds a data signal representing payment or other information to audio output channel 244. As noted above, this signal is configured to be the dominant signal on audio output channel 244.

Although the various embodiments are described with the intentional noise signal being provided at all times, the present technology is not limited in this regard. In some embodiments, the reader device 230 can be configured to provide momentarily discontinue the intentional noise signal when a data signal is being transmitted. This can be done to save power or to improve SNR when the data signal is being transmitted. For example, the microcontroller 250 can be configured to control the operation of the noise generator 280, noise coupling circuitry, or both, to provide such functionality. In some cases, the signals can overlap to ensure that the gain at the ACG sub-circuit 216 is substantially stable prior to discontinuing the intentional noise signal.

At host device 200, the signal at the output terminal of the connector 231 is received on audio input channel 206. The ACG sub-circuit 216 then processes the received signal. In the case where the signal on audio input channel 206 also includes the data signal, the gain is reduced to compensate for the dominant data signal (i.e., the signal is attenuated to a reference level based on the stronger data signal). The attenuated signal is then passed through ADC 218 and demodulated by DMOD 220. As a result, the attenuation by ACG sub-circuit 216 reduces the weaker signals associated with the intentional noise signal or spurious or random noise signals. As a result, the SNR is improved for the data signal. Thus, once processed by ADC 218 and DMOD 220, the application will detect the receipt of payment information and process the information accordingly.

In the case where the signal on audio input channel 206 does not include a data signal, the received signal is dominated by the intentional noise signal of the present technology. As a result, the gain of the ACG sub-circuit 216 is increased to compensate for weaker intentional noise signal, relative to the data signal (i.e., the signal is amplified to a reference level). However, since the intentional noise signal is selected to be stronger and substantially constant, with respect to spurious or random noise signals, the intentional noise signal is dominant and the gain at the AGC will remain substantially invariant until a data signal is once again added to the audio input channel. As a result, even in the presence of a large amount of spurious or random noise signals, the gain will not substantially vary and the gain of the AGC will remain strongly, if not completely, dependent on the intentional noise signal. Thus, once this signal is processed by ADC 218 and DMOD 220, the signal will result in no digital data of interest to the application being generated. Thus, no attempted processing of a transaction will occur.

In some embodiments, rather than coupling the intentional noise signal via noise coupling circuitry 282, the noise generator 280 can be configured to forward the intentional noise signal, or information for generating such a signal, directly to the microcontroller 250. The microcontroller 250 can then generate a signal for audio output channel 244 that already includes the intentional noise signal.

As noted above, in alternative embodiments the noise generator 280 can be implemented as module in microcontroller 250. Thus, when an audio noise signal is required on output audio channel 244, the noise generator 280 can configure or control the microcontroller 250 to generate the audio noise signal via generating the necessary input signals for D/A converter 242. For example, the input signals for D/A converter 242 can be configured so that the audio noise signal is an alternating current waveform in which at least the frequency and an amplitude remain substantially constant, similar to the type of signal that would be generated by a charge pump. In another example, the input signals for D/A converter 242 can be configured so that the audio noise signal is persistent audio noise signal generated by a stochastic or random process (e.g., a white, blue, violet, pink, red, brown, or gray noise audio signals) having an average output level that is sufficient to set the gain in the AGC 216 of host device 200 in the manner described above with respect to FIGS. 1A-1C.

Although the generation of the intentional noise signal is described above as exclusively occurring at the reader device, the various embodiments are not limited in this regard. In some configurations, the intentional noise signal can be generated by the host device. Such a configuration can be provided to reduce the number of components required in the reader device or to "upgrade" the operation of existing reader devices without an intentional noise generator or noise source. For example, in one exemplary embodiment, an application executing on the host device and associated with the reader device can be configured to cause the host device to generate the intentional noise signal. This signal can then be transmitted to the reader device for use therein. For example, referring back to FIGS. 2A and 2B, the intentional noise signal can be generated at microprocessor 210 and transmitted via audio output channel 208 to reader device 230. At reader device 230, the intentional noise signal can be received and the microcontroller 250 can be configured to add the intentional noise signal to audio output channel 244. This operation of the microcontroller 250 can be provided via a firmware update or the like.

Figure 3A:
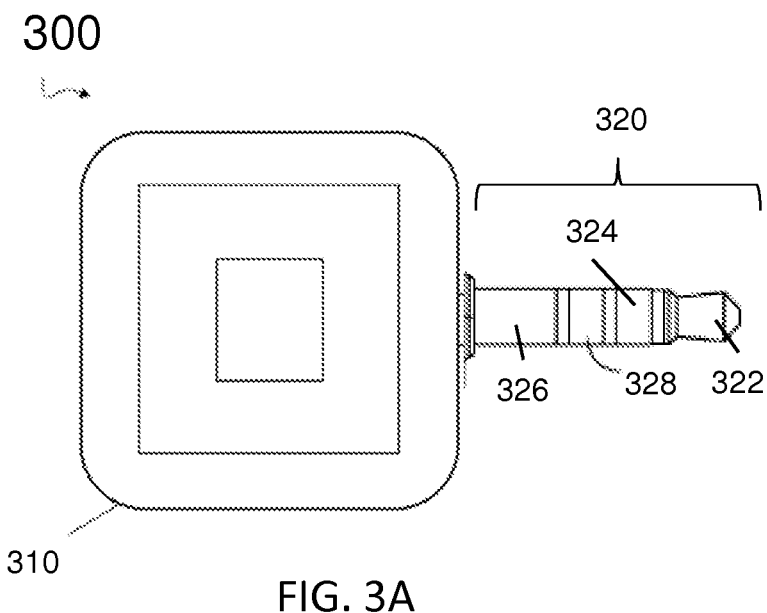
FIGS. 3A and 3B illustrate front and side views of an example card reader device, including a 3.5 mm audio plug.
Figure 3B:
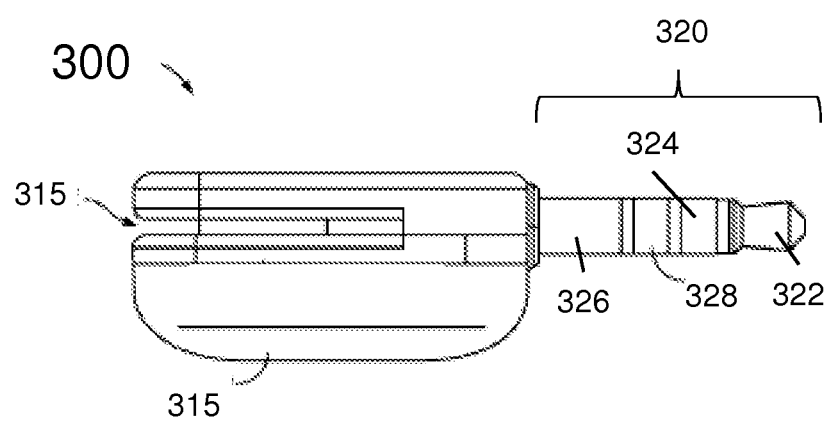

FIGS. 3A and 3B illustrates an example reader 300 according to some embodiments of the subject technology. As illustrated, reader 300 includes a housing 310 that is coupled to an audio plug 320 (e.g., a 3.5 mm audio plug).

Housing 310 contains the hardware components and circuitry of reader 300, as illustrated with respect to the example of FIG. 2B. Additionally, body portion 310 includes a slot 315 through which a payment card, such as a credit or debit card, may be swiped. Passage of a magnetic stripe of the payment card past a read head (e.g., media interface 260 contained in housing 310) can enable payment information to be received via the read head. The resulting signal provided by the read head is typically an analog signal that must be digitized e.g., using ADC 240, before the resulting digital information is provided to microcontroller 250.

Different types of information can be read from a magnetic stripe, depending on implementation. For example, user and payment card account information can be read from track 1 and track 2 of the magnetic stripe, respectively. However, in other implementations, any track (or combination of tracks)

may be read from the magnetic stripe, including any combination, or all of tracks 1, 2 and 3.

As illustrated, body portion 310 is physically and communicatively coupled to audio plug 320, which can be removably inserted into a headphone port of a host device, such as a smart phone, personal computer, tablet device, or the like. As discussed above with respect to FIG. 1, audio plug 320 forms part of an audio bus that includes left and right audio output channels (via left/right contacts 322, 324), an audio input channel (via microphone contact 326), and a ground connection (via ground contact 328). Once audio plug 320 is inserted into the compatible jack of a host device, such as a smartphone, bi-directional communication between reader 300 and the host is enabled e.g., via the left/right audio output channels and audio input channel, using the methods and systems discussed above.

Although the reader illustrated in FIG. 3 can accept payment cards containing a magnetic stripe (e.g., using a read head), it is understood that the reader can be configured to receive other types of payment cards, and accordingly can contain additional or different hardware and/or software modules than those described above with respect to FIG. 2B. For example, housing 310 can include a dip slot for accepting integrated circuit cards, such as those conforming to the Europay, Mastercard, and Visa (EMV) standard.

Once successful bidirectional communication has been established between the reader and its host, the reader can be used to facilitate a payment transaction, for example between a merchant and a buyer using a magnetic payment card.

Figure 4:
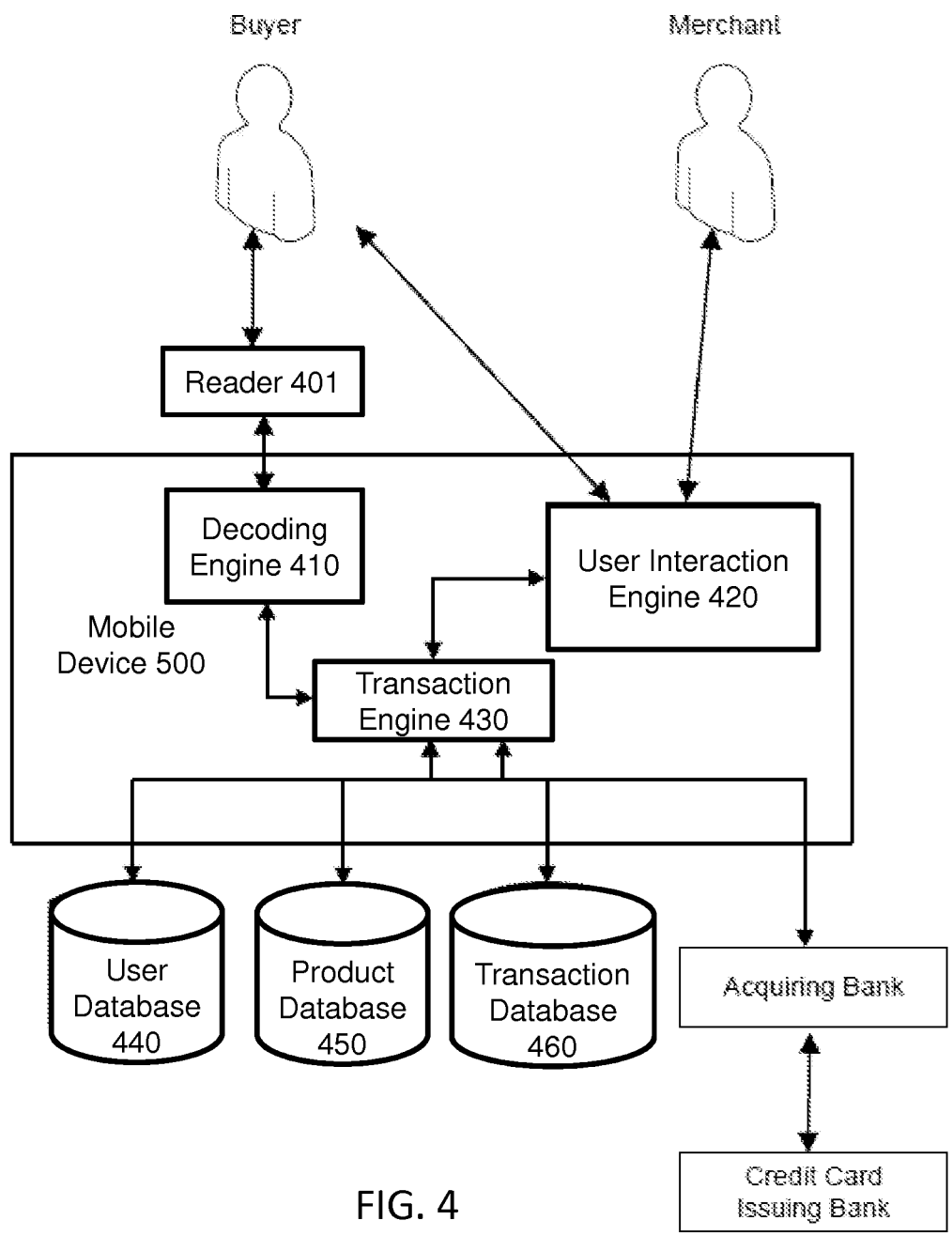
FIG. 4 depicts a conceptual environment in which a reader device of the subject technology can be used to facilitate a financial transaction between a buyer and a merchant.

FIG. 4 depicts a conceptual environment in which a reader of the subject technology can be used to facilitate a financial transaction between a buyer and a merchant. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 4, the system includes a mobile device 400, a reader 401 connected to mobile device 400, a decoding engine 410, a user interaction engine 420, and a transaction engine 430, all running on mobile device 400. Additionally, the system may also include one or more of a user database 440, a product or service database 450, and a transaction database 460, and a firmware database 470 all coupled to the transaction engine 430.

As used herein, the term engine refers to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 4, mobile device 400 to which reader 401 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 400 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 430 running on mobile device 400. In response to a financial transaction between a buyer and a seller, mobile device 400 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 4, reader 401 is configured to read data encoded in a magnetic strip of a card being swiped by a buyer and send a signal that corresponds to the data read to mobile device 400. However, as discussed above, reader 401 may be configured to received various payment card types, including but not limited to IC cards that can be provided to reader 401 using a dip slot.

The size of reader 401 can be miniaturized to be portable for connection with mobile device 400. For example, the size of card reader 401 can be miniaturized to an overall length of less than 1.5". In addition, the miniaturized card reader 401 is also designed to reliably read the card with minimum error via a single swipe by counteracting vendor specific filtering done by mobile device 401. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While various embodiments of the present technology have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the present technology has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Also, the terms "about", "substantially", "approximately", or variants thereof, as used herein with respect to a stated value or a property, are intend to indicate being within 20% of the stated value or property, unless otherwise specified above. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A point-of-sale system, comprising:
    a portable computing device comprising an audio jack coupled to an audio input channel, an automatic gain control (AGC) sub-circuit associated with the audio input channel, a signal processing system for processing audio signals on the audio input channel to produce digital data signals, a processor coupled to the signal processing system for receiving the digital data signals, and a payment processing application; and
    a card reader coupled to the portable computing device, the card reader being configured to enable a financial transaction between a customer and a merchant via the portable computing device via the payment processing application,
    wherein the card reader comprises:
        a read head,
        an audio output channel,
        an audio plug coupled to the audio output channel and configured to engage the audio jack such that the audio output channel of the card reader is coupled to the audio input channel of the portable computing device,
        a controller communicatively coupled to the read head and the output audio channel, and
        a charge pump configured for supplying power to the controller and operating at a switching frequency that is an audio frequency,
    wherein the payment processing application is configured to cause the processor to initiate the financial transaction in response to receiving the digital data signals,
    wherein the charge pump is coupled to the audio output channel so as to cause audio noise signal in the audio output channel that is propagated to the audio input channel of the portable computing device, and wherein the audio noise signal is configured to establish a first gain amount at the AGC sub-circuit that is lower than a second gain amount required for amplifying other audio noise signals present in the audio input channel into audio signals that can be processed into digital data signals by the signal processing system.

2. The card reader of claim 1, wherein the charge pump is coupled to the audio output channel by at least one of a capacitive coupling, a resistive coupling, or an inductive coupling.

3. The card reader of claim 1, wherein audio noise signal is an alternating current waveform in which at least a frequency and an amplitude are substantially constant.

4. The card reader of claim 1, wherein the controller is configured for transmitting, via the output audio channel, an audio data signal representing payment information detected at the read head that is propagated to the audio input channel, wherein the audio data signal causes the AGC sub-circuit to establish a third gain amount lower than the first gain amount, and wherein the third gain amount amplifies the audio data signal sufficiently for the signal processing system to process the audio data signal into digital data signals.

5. A reader device, comprising:
    at least one media reader;
    at least one analog signal connector configured for engaging an analog signal port associated with a networked computing device;
    a noise generator coupled to an audio output channel, wherein the noise generator operates at a switching frequency within a frequency range associated with a data signal; and
    a device electronics communicatively coupled to the at least one media reader, the at least one analog signal connector, and the noise generator,
    wherein the noise generator and the device electronics are configured to introduce an intentional noise signal into the at least one analog signal connector, via the audio output channel, and wherein the intentional noise signal is configured to establish a substantially stable gain amount at an automatic gain control (AGC) sub-circuit of the networked computing device when the at least one analog signal connector is engaged with the analog signal port.

6. The reader device of claim 5, wherein the device electronics is configured for transmitting, via the at least one analog signal connector, a data signal representing information detected via at the at least one media reading device, whereby the data signal causes the AGC sub-circuit to establish a gain amount lower than the substantially stable gain amount established based on the noise signal.

7. The reader device of claim 6, wherein the data signal and the intentional noise signal each comprise an audio signal.

8. The reader device of claim 6, wherein the device electronics is configured for causing the intentional noise signal to be discontinued while the data signal is being transmitted.

9. The reader device of claim 5, wherein the noise generator is configured for generating noise information, and wherein the device electronics comprises a controller for receiving the noise information and generating an output signal for the at least one analog signal connector, comprising the intentional noise signal, based on the noise information.

10. The reader device of claim 5, wherein the noise generator comprises an analog signal generator.

11. The reader device of claim 5, wherein the noise generator is coupled to the at least one audio signal connector by at least one of capacitive coupling, resistive coupling, or inductive coupling.

12. The reader device of claim 5, wherein the device electronics comprises a controller and a non-transitory computer-readable medium containing instructions that, when executed by a controller, cause the controller to implement the noise generator.

13. The reader device of claim 12, wherein the computer program is configured for causing the controller generate the audio noise signal using a stochastic process.

14. A method for managing operation of an automatic gain control (AGC) sub-circuit coupled to an analog data signal path susceptible to noise, the method comprising:

generating an intentional noise signal, by a noise generator coupled to the analog data signal path, wherein the noise generator operates within a frequency range associated with a data signal; and introducing the intentional noise signal, by a controller communicatively coupled to at least one analog signal connector and the noise generator, into the at least one signal connector, via the analog data signal path, wherein the generating of an intentional noise signal, by the controller, comprises configuring the intentional noise signal to establish a substantially stable first gain amount at an automatic gain control (AGC) sub-circuit lower than a second gain amount required for detecting the other noise signals generated in the analog data signal path when the at least one analog signal connector is engaged with an analog signal port associated with a networked computing device.

15. The method of claim 14, wherein the generating comprises configuring the intentional noise signal so that the first gain amount at the AGC sub-circuit is greater than a third gain amount at the AGC sub-circuit for a data signal introduced into the analog data signal path.

16. The method of claim 14, wherein generating comprises producing the intentional noise signal using a stochastic process, and wherein the introducing comprises introducing the intentional noise signal into the analog data signal path.

17. The method of claim 16, wherein generating comprises producing an alternating current signal at an audio signal frequency to produce an alternating current signal, and wherein the introducing comprises introducing at least the high frequency component into the analog data signal path.

18. The method of claim 14, further comprising:
adding a data signal to the analog data signal path; and
discontinuing generating and the introducing during the adding.

* * * * *